US012583418B2

(12) United States Patent
Hambusch et al.

(10) Patent No.: US 12,583,418 B2
(45) Date of Patent: Mar. 24, 2026

(54) FILLING DEVICE FOR A VEHICLE, AND VEHICLE HAVING SUCH A FILLING DEVICE

(71) Applicant: Bayerische Motoren Werke Aktiengesellschaft, Munich (DE)

(72) Inventors: Thorsten Hambusch, Landshut (DE); Nico Rehtanz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 206 days.

(21) Appl. No.: 18/285,395

(22) PCT Filed: Mar. 16, 2022

(86) PCT No.: PCT/EP2022/056831
§ 371 (c)(1),
(2) Date: Oct. 3, 2023

(87) PCT Pub. No.: WO2022/214286
PCT Pub. Date: Oct. 13, 2022

(65) Prior Publication Data
US 2024/0181993 A1 Jun. 6, 2024

(30) Foreign Application Priority Data
Apr. 8, 2021 (DE) ..................... 10 2021 108 806.2

(51) Int. Cl.
B60S 1/50 (2006.01)
(52) U.S. Cl.
CPC ...................................... B60S 1/50 (2013.01)
(58) Field of Classification Search
CPC .......... B60S 1/50; B60K 15/05; B60K 15/053
See application file for complete search history.

(56) References Cited

U.S. PATENT DOCUMENTS

| | | | |
|---|---|---|---|
| 1,324,995 | A | 12/1919 | Bowers |
| 2,508,124 | A | 5/1950 | Stephenson |

(Continued)

FOREIGN PATENT DOCUMENTS

| | | |
|---|---|---|
| CA | 2235300 A1 | 10/1998 |
| CN | 205396032 U | 7/2016 |

(Continued)

OTHER PUBLICATIONS

International Search Report (PCT/ISA/210) issued in PCT Application No. PCT/EP2022/056831 dated Jul. 11, 2022 with English translation (4 pages).

(Continued)

*Primary Examiner* — Timothy L Maust
(74) *Attorney, Agent, or Firm* — Crowell & Moring LLP

(57) ABSTRACT

A filling device for a vehicle, in particular a motor vehicle, includes: a vehicle body flap which forms at least part of a skin of the vehicle and is designed to pivot between a first position and a second position that differs from the first position, the vehicle body flap having an opening; a container for storing a fluid; and a filler neck which is mounted on the vehicle body flap such that the filler neck can pivot along with the vehicle body flap relative to the container between the first position and the second position and is connected to the opening. When the vehicle body flap is in the first position, an end portion of the filler neck is partially inserted into an opening portion of the container such that the container can be filled with fluid via the opening and the filler neck. A bearing is provided to support the opening portion of the container or the end portion of the filler neck in a starting position and allow the opening portion or end portion to move from the starting position to a compensating position within one or more specified degrees of freedom such that an offset of the other portion when the end portion (Continued)

is inserted into the opening portion is compensated by the movement of opening portion or end portion into the compensating position.

11 Claims, 2 Drawing Sheets

(56) References Cited

U.S. PATENT DOCUMENTS

| | | | |
|---|---|---|---|
| 3,341,214 A | | 9/1967 | Komenda |
| 4,706,719 A | * | 11/1987 | Eversdijk ................ B67C 11/02 |
| | | | 141/98 |
| 4,886,182 A | * | 12/1989 | Fedelem ................ B60K 15/04 |
| | | | 141/331 |
| 6,810,932 B1 | | 11/2004 | Corven et al. |
| 7,677,631 B1 | | 3/2010 | Zischke et al. |
| 2016/0046184 A1 | | 2/2016 | Luehn et al. |
| 2017/0137000 A1 | * | 5/2017 | Huebner .............. B62D 25/085 |
| 2019/0084411 A1 | | 3/2019 | Husberg et al. |
| 2021/0031728 A1 | | 2/2021 | Hambusch |

FOREIGN PATENT DOCUMENTS

| | | |
|---|---|---|
| CN | 207790626 U | 8/2018 |
| CN | 109515171 A | 3/2019 |
| CN | 111971209 A | 11/2020 |
| DE | 1 227 358 A | 10/1966 |
| DE | 197 16 812 A1 | 10/1998 |
| DE | 199 07 389 A1 | 8/2000 |
| DE | 10 2013 004 926 A1 | 9/2014 |
| DE | 10 2013 012 630 A1 | 1/2015 |
| DE | 20 2016 106 334 U1 | 2/2017 |
| DE | 10 2018 208 398 A1 | 11/2019 |
| DE | 10 2018 128 853 A1 | 5/2020 |
| FR | 2 895 357 A1 | 6/2007 |
| FR | 2 895 358 A3 | 6/2007 |
| GB | 431604 A | 7/1935 |
| GB | 618450 A | 2/1949 |
| JP | 5-37619 U | 5/1993 |
| JP | 2012-116274 A | 6/2012 |
| JP | 2012-224141 A | 11/2012 |
| KR | 10-2008-0019339 A | 3/2008 |
| WO | WO 2019/229003 A1 | 12/2019 |

OTHER PUBLICATIONS

German-language Written Opinion (PCT/ISA/237) issued in PCT Application No. PCT/EP2022/056831 dated Jul. 11, 2022 with English translation (8 pages).

German-language Office Action issued in German Application No. 10 2021 108 806.2 dated Feb. 22, 2022 (6 pages).

International Search Report (PCT/ISA/210) issued in PCT Application No. PCT/EP2022/056830 dated Jul. 11, 2022 with English translation (4 pages).

German-language Written Opinion (PCT/ISA/237) issued in PCT Application No. PCT/EP2022/056830 dated Jul. 11, 2022 with English translation (9 pages).

German-language Office Action issued in German Application No. 10 2021 108 805.4 dated Feb. 22, 2022 (7 pages).

English translation of Chinese-language Office Action issued in Chinese Application No. 202280012202.0 dated Dec. 26, 2025 (4 pages).

* cited by examiner

FILLING DEVICE FOR A VEHICLE, AND VEHICLE HAVING SUCH A FILLING DEVICE

CROSS REFERENCE TO RELATED APPLICATION

This application contains subject matter related to U.S. application Ser. No. 18/285,400, entitled "Filling Device for a Vehicle, and Vehicle Having Such a Filling Device," filed on Oct. 3, 2023.

BACKGROUND AND SUMMARY

The present invention relates to a filling apparatus for a vehicle, in particular for a motor vehicle, and to a vehicle having such a filling apparatus.

In conventional vehicles such as motor vehicles, filling apparatuses are known, for example, in the context of the filling of a wash water container of a conventional windshield washing system.

Generally, in conventional windshield washing systems, provision is made of a filler neck for the wash water container below a body flap, such as a vehicle front flap, or below an engine hood in the engine compartment.

Alternative designs provide the filler neck, for example, in a water channel of a rear flap of the vehicle. Further designs provide for filling the wash water container via a hood gap, for example between the engine hood and the fender.

If the vehicle has a front flap which is intended to be actuated only in a workshop by means of a special tool and which is largely referred to as a so-called "service flap", the filler neck of the wash water container is not readily accessible. The provision of visible individual flaps or covers in vehicle body elements, which are subject to specific design requirements, is, for design and manufacturing reasons, generally avoided if this is possible.

A further embodiment known from the prior art is shown in FIG. 1, which illustrates a schematic illustration of a filling apparatus 1' belonging to the prior art in a cross-sectional view.

In principle a vehicle, in particular a motor vehicle, not shown in more detail in FIG. 1, comprises the filling apparatus 1' which has a vehicle body flap 2' which forms at least part of a skin of the vehicle and is designed to be pivoted between a first position and a second position that differs from the first position, wherein the vehicle body flap 2' has an opening 7' as shown in FIG. 1. In the case shown, the vehicle body flap 2' is a vehicle body outer part, in particular a front flap or an engine hood, of the vehicle.

The second position corresponds to a conventional open position of the front flap or the engine hood so that the engine compartment is accessible, while the first position is a conventional closed position of the front flap or engine hood.

The filling apparatus 1' also comprises a device for opening and closing the opening 7' by means of a pivotable cover element 4' provided on the opening 7', and a filler neck which is arranged in relation to the opening 7' such that the filler neck 3' can be filled with a fluid such as a windshield washer fluid via the opening 7' when the vehicle body flap 2' is in the first position, i.e. when the vehicle body flap 2' is in the closed position.

The device for opening and closing comprises a bearing 5' which pivotably mounts the cover element 4' on the filler neck 3'. Accordingly, the cover element 4' can be moved for opening the opening 7' and for closing the opening 7', wherein in the position closing the opening 7' the cover element 4' bears sealingly against the vehicle body flap 2'.

The filler neck 3' is connected to a container 9' for windshield wiper water so that the container 9' for the windshield wiper water can be filled via the filler neck. The filler neck 3' and the container 9' for windshield wiper water are designed as separate components. In particular, the filler neck 3' is connected to the vehicle body flap 2' such that when the vehicle body flap 2' is pivoted from the first position in the direction of the second position the filler neck 3' and the cover element 4' move along with the vehicle body flap 2', while the container 9' for windshield wiper water remains positionally fixed in relation to the vehicle structure.

If the vehicle body flap 2' is moved from the second position back to the first position, a lower end portion or edge portion 10' of the filler neck 3' and an opening 12' of the container 9 for windshield wiper water are sealingly brought into engagement or contact with one another, such that the lower end portion is provided with a conically designed sealing ring which is sealingly introduced into the opening 12' via a frictional and/or form-fitting connection, as shown in FIG. 1.

For example, an emblem, not illustrated in more detail, can be provided at an outer side of the cover element 4' such that the cover element 4' is concealed or inconspicuous from a visual or design aspect.

If the filler neck 3' and the container 9' for windshield wiper water are exactly aligned, when the vehicle body flap 2' is moved from the second position (open front flap) into the first position (closed front flap) a watertight connection can be produced between the filler neck 3' which is fixed to the flap and and the container 9' which is fixed to the vehicle body.

However, this watertight connection between the filler neck 3', which is fixed to the flap, and the container 9', which is fixed to the vehicle body, cannot always be produced if, for example, an offset, for example respectively of several millimeters, is produced between these elements (fixed to the flap/fixed to the vehicle body) in all of the three coordinate directions, i.e. the x-direction, y-direction and z-direction of the conventional vehicle coordinate system, due to potential variations in production.

An insertion of the filler neck 3', which is fixed to the flap, into a mating connector of the container 9', which is fixed to the vehicle body, can be ensured without the elements colliding, due to sufficient clearance and optionally due to the provision of insertion bevels.

However, firstly it is not possible to compensate fully for the clearly off-center position of the lower end portion or the edge portion 10' of the filler neck 3' in the x-direction and y-direction by the use of seals, and secondly it is also not possible to ensure a sealed bearing of the seal provided on the edge portion 10' in the z-direction.

Accordingly it can lead to leakages between the filler neck 3', which is fixed to the flap, and the container 9', which is fixed to the vehicle body, such that for example when filling the filler neck 3' water can flow unnoticed over components of the vehicle located thereunder, optionally electrical or electronic components, and cause damage.

It is therefore the object of the present invention to provide a filling apparatus and a motor vehicle having such a filling apparatus which can remedy the above-described problems of the prior art.

In particular, it is the object of the present invention to provide a filling apparatus and a motor vehicle having such a filling apparatus which can ensure a sealed connection between the filler neck and the container which is fixed to the vehicle body.

This object is achieved by a filling apparatus and a vehicle having such a filling apparatus, in accordance with the independent claims. Advantageous embodiments and developments of the invention emerge from the dependent claims.

The filling apparatus according to the invention is provided for a vehicle, in particular for a motor vehicle, and comprises:
a vehicle body flap which forms at least part of a skin of the vehicle and is designed to be pivoted between a first position and a second position that differs from the first position, wherein the vehicle body flap has an opening, a container for storing a fluid, and a filler neck which is mounted on the vehicle body flap in such a way that the filler neck can pivot along with the vehicle body flap relative to the container between the first position and the second position and is connected to the opening, wherein when the vehicle body flap is in the first position an end portion of the filler neck is partially inserted into an opening portion of the container in such a way that the container can be filled with fluid via the opening and the filler neck, wherein a bearing is provided which is designed to support an element consisting of the opening portion of the container or the end portion of the filler neck in a starting position and to allow the one element to move from the starting position to a compensating position within one or more specified degrees of freedom, such that an offset of the other element when the end portion is inserted into the opening portion is compensated by the movement of the one element into the compensating position.

Preferably, the bearing is designed to support the opening portion of the container in a starting position and to allow a movement of the opening portion from the starting position to a compensating position within one or more specified degrees of freedom, such that when the end portion is inserted into the opening portion an offset of the filler neck is compensated by the movement of the opening portion into the compensating position.

According to the invention, therefore, a filling apparatus can be provided, the end portion or lower edge portion of the filler neck being able to be inserted thereby in a centered manner into the opening portion of the container and at the same time being able to be sealed thereby. The centering is carried out by the end portion of the filler neck, which is configured as a cone, i.e. on the neck which is fixed to the flap, and which moves into the opening portion of the container which is configured as a mating connector during a rotational and/or translational movement of the end portion in approximately the z-direction of the conventional vehicle coordinate system and centers this with minimum clearance in the x-direction and z-direction of the conventional vehicle coordinate system.

In order to make this possible, according to the invention it is provided that the mating connector is mounted on the storage container, which is fixed to the vehicle body, so as to be movable in all three spatial directions within defined limits as predetermined by the bearing. The mating connector is preferably held such that it can adopt the starting position again (defined zero position) after the vehicle body flap has been opened, for example by means of a restoring force which is preferably applied by a restoring spring. A rotary seal can also be provided on the filler neck, which is fixed to the flap, the seal being pushed axially, in particular in the z-direction, onto the mating connector which in turn applies the sealing pressure by compression, for example of a folding bellows, and implements the tolerance compensation.

The filling apparatus according to the invention can also be configured such that the bearing is designed to compensate for an offset of the filler neck only as far as a maximum compensating position and, when the maximum compensating position is reached, to counteract a further movement of the opening portion or to block the further movement.

The filling apparatus according to the invention can also be designed such that the bearing is designed as a floating bearing.

Moreover, the filling apparatus according to the invention can be implemented such that the opening portion is configured in a funnel-shaped manner, such that when the vehicle body flap is pivoted from the second position thereof into the first position thereof the filler neck is centered by the opening portion, while the bearing compensates for the offset.

Moreover, the filling apparatus according to the invention can be such that the opening portion is held in the starting position by a restoring force and/or the opening portion is moved back from a compensating position into the starting position by the restoring force of the bearing.

The filling apparatus according to the invention can also be implemented such that the filler neck is provided with a sealing ring on the end portion thereof, wherein the sealing ring on the outer periphery thereof has a peripheral sealing lip which is in contact with an internal peripheral surface of the opening portion when the vehicle body flap is in the first position.

Moreover, the filling apparatus according to the invention can be developed such that the opening portion is partially configured as a folding bellows which, when the vehicle body flap is in the first position, is designed to exert a counter-force as a reaction to a force applied by inserting the end portion of the filler neck into the opening portion, whereby the seal is pushed further into the opening portion.

The filling apparatus according to the invention can also be designed such that an emblem is provided on an outer side of a cover element which is provided on the opening and/or the vehicle body flap is a vehicle body outer part, in particular a front flap or an engine hood, of the vehicle.

The vehicle according to the invention is, in particular, a motor vehicle and comprises the filling apparatus according to the invention.

This results in the properties and advantages mentioned in connection with the filling apparatus according to the invention in the same way, and for this reason, to avoid repetition, reference is made to the above embodiments in connection with the filling apparatus according to the invention.

A preferred embodiment of the invention will be described below with reference to the figures.

DETAILED DESCRIPTION OF THE DRAWINGS

Figure 1:
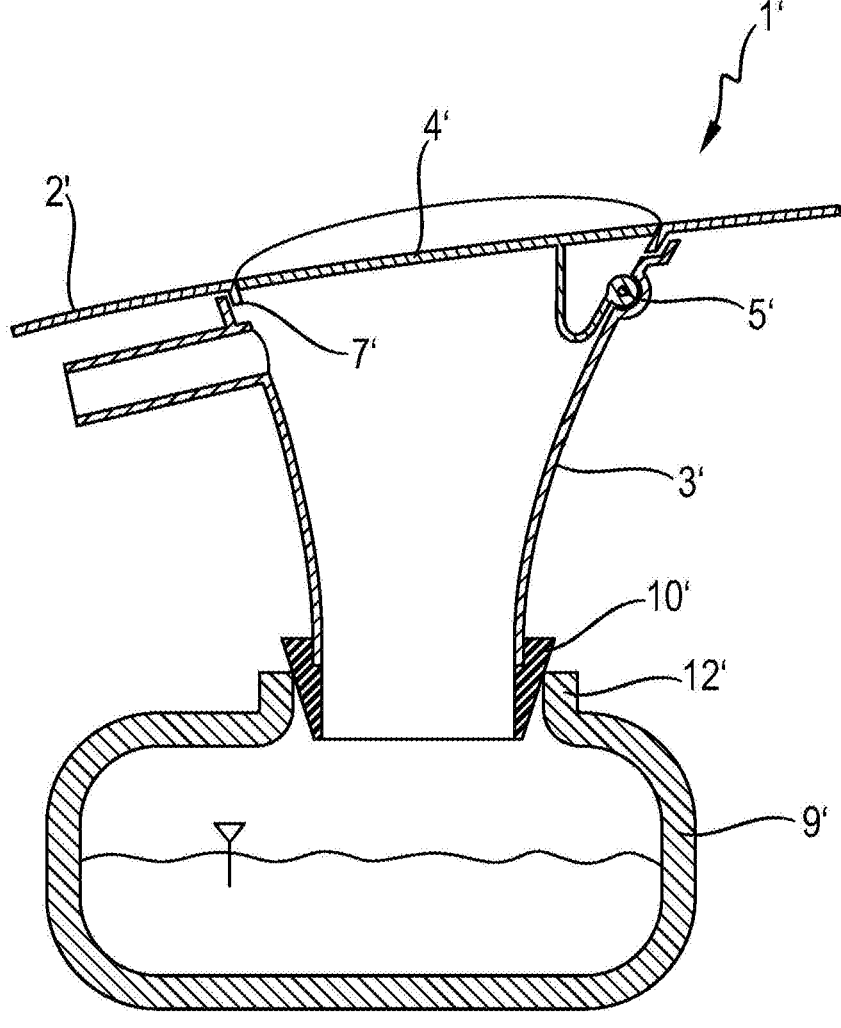
FIG. 1 is a schematic illustration of a filling apparatus according to the prior art.
Figure 2:
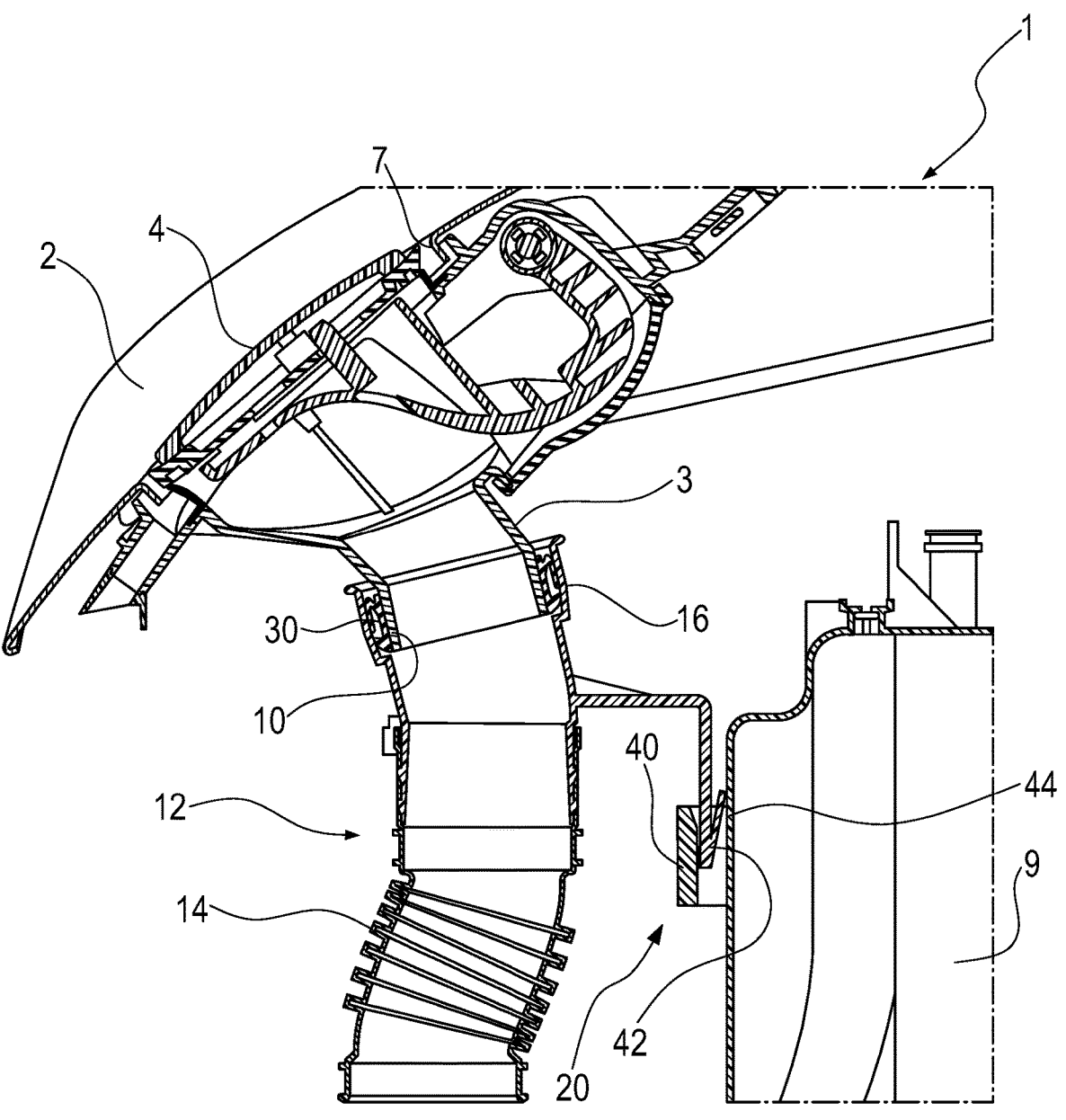
FIG. 2 is a schematic, cross-sectional, view of a filling apparatus according to an embodiment of the invention.

FIG. 2 shows a schematic illustration of a filling apparatus 1 according to an embodiment of the invention in a cross-sectional view, wherein identical or similar elements of the filling apparatus 1 according to the invention are provided with identical or similar reference signs relative to those of the filling apparatus 1' belonging to the prior art and shown in FIG. 1. In the following description, primarily the differences in relation to the filling apparatus 1' belonging to the prior art will be discussed in more detail.

As shown in FIG. 2, the filling apparatus 1 is provided for a vehicle which is not shown in more detail and which in this exemplary embodiment is a motor vehicle.

The filling apparatus 1 comprises a vehicle body flap 2 which is formed as a vehicle body outer part by a front flap or an engine hood of the vehicle and thus forms a part of a skin of the vehicle.

The vehicle body flap 2 is designed to be pivoted between a first position and a second position that differs from the first position, wherein the vehicle body flap 2, which is designed as a front flap or engine hood, in the first position is in a closed state, i.e. it closes the engine compartment of the vehicle, while the vehicle body flap 2 in the second position is in an open state, i.e. it opens up the engine compartment of the vehicle or makes it accessible from outside.

The vehicle body flap 2 also has an opening 7 which can be closed or opened via a cover 4 on which an emblem can be provided.

The filling apparatus 1 also has a container 9 for storing a fluid, in this case for storing windshield wiper water, and which is fixedly fastened to the vehicle structure, and also has a filler neck 3 which is mounted on the vehicle body flap 2 such that the filler neck 3 together with the vehicle body flap 2 can be pivoted relative to the container 9 between the first position and the second position and is connected to the opening 2.

An end portion 10 of the filler neck 3, which is configured in the form of a centering cone, as visible in FIG. 2, is partially inserted into an opening portion 12 of the container 9 when the vehicle body flap 2 is in a first position, such that the container 9 can be filled with fluid via the opening 7 and the filler neck 3, as illustrated in FIG. 2.

As also visible in FIG. 2, the opening portion 12 is configured in the form of a funnel 16 for receiving the centering cone. The funnel 16 is connected via a folding bellows 14 to the container 9.

In the exemplary embodiment shown, the filling apparatus 1 also has a bearing 20 which is designed to support the opening portion 12 of the container 9 in a starting position (zero position) and to allow a movement of the opening portion 12 from the starting position to a compensating position within several specified degrees of freedom, namely degrees of freedom in the x-direction, y-direction and z-direction of the conventional vehicle coordinate system. Naturally, depending on the application, it is contemplated to allow degrees of freedom only in a few specific directions of the conventional vehicle coordinate system, for example only in the x-direction and z-direction, if a centering in the y-direction is not necessary; any combinations of the degrees of freedom in the respective directions are contemplated.

Preferably, the bearing 20 is designed to compensate for an offset of the filler neck 3 only as far as a maximum compensating position and, when the maximum compensating position is reached, to counteract a further movement of the opening portion 12 and to block the further movement beyond the maximum compensating position. In other words, in the exemplary embodiment shown the bearing 20 is implemented as a holder which allows a possibility of movement of the opening portion 12 in the three spatial directions, i.e. x-direction, y-direction and z-direction of the vehicle coordinate system, until the maximum compensating position is reached in the respective direction. For example, the holder can be designed in the form of a hook 42 which extends away from the opening portion 12 and which engages in a duct 40, which is configured on the container 9, and can be moved in a predefined manner in the x-direction, y-direction and z-direction up to a certain extent, i.e. the maximum compensating position. In particular, the hook 42 is freely movable in the duct 40. A spring element 44 is also provided, preferably injection-molded, on the hook 42 in order to move back the neck, which is fixed to the vehicle body or which is fixed to the vehicle structure, in the form of the opening portion 12 into the starting position in the x-direction and y-direction of the conventional vehicle coordinate system. The location or position of the opening portion 12 in the z-direction is, however, predetermined by the position or connection of the opening portion 12 to the container 9 via the folding bellows 14, for example in the form of a corrugated tube. Thus the injection-molded spring element 44 and the folding bellows 14 function as a spring element for applying a restoring force onto the opening portion 12 such that the opening portion 12 is forced back from the compensating position thereof into the starting position thereof.

Accordingly, using the so-called "floating" bearing 20, it is possible to compensate for an offset of the filler neck 3 when the end portion 10 is inserted into the opening portion 12 by the movement of the opening portion 12 into the compensating position. As already mentioned, due to the implemented spring element the bearing 20 is configured such that the opening portion 12 is held in the starting position by the restoring force and accordingly is moved back from a compensating position into the starting position by the restoring force of the bearing 20. The cooperation of the hook/duct/folding bellows can thus expediently act as a restoring spring.

As is also visible in FIG. 2, the opening portion 12 is configured as a funnel 16, i.e. conically, and widens in the positive z-direction such that the filler neck 3, which is also configured conically but to taper in the negative z-direction on the end portion 10 thereof, is centered by the opening portion 12 when the vehicle body flap 2 is pivoted from the second position thereof into the first position thereof, while the bearing 20 compensates for the offset.

In order to implement a sealed connection between the filler neck 3 and the opening portion 12, the filler neck 3 is provided with a sealing ring 30 on the end portion 10 thereof, wherein the sealing ring 30 on the outer periphery thereof has a peripheral sealing lip which is in contact with an internal peripheral surface of the opening portion 12 or the funnel 16 when the vehicle body flap 2 is in the first position.

Moreover, the opening portion 12, as already mentioned above, is partially configured as the folding bellows 14 which, when the vehicle body flap 2 is in the first position, is designed to exert a counter-force, preferably in the positive z-direction, as a reaction to a force applied by inserting the end portion 10 of the filler neck 3 into the opening portion 12, whereby the seal 30 is pushed further into opening portion 12.

Thus, according to the invention, a functional separation regarding the centering of the filler neck 3 relative to the opening portion 12 and regarding the seal 30 thereof can be undertaken using the filling apparatus 1.

In this exemplary embodiment, an emblem, not illustrated in more detail, is provided on an outer side of a cover element 4 which is provided on the opening 7 for opening and closing the opening 7, such that the cover element 4 is concealed or inconspicuous from a visual or design aspect.

In an alternative embodiment of the invention, the hook 42 and the duct 40 are configured by a flat receiver and a centering top which is floatingly mounted in two spatial directions and fixed to the container, whereby a bearing can be implemented with degrees of freedom in the x-direction and y-direction but not in the z-direction.

In this case, a centering of the opening portion only takes place in the x-direction and y-direction, which can be sufficient if it is ensured that the end portion 10 of the filler neck 3 is inserted sufficiently far into the opening portion 12. The features of the invention that are disclosed in the above description, in the drawings and in the claims may be essential to the realization of the invention both individually and in any desired combination.

What is claimed is:

1. A filling apparatus for a motor vehicle, comprising:
a vehicle body flap which forms at least part of a skin of the vehicle and is designed to be pivoted between a first position and a second position that differs from the first position, wherein the vehicle body flap has an opening therethrough;
a container for storing a fluid;
a filler neck which is mounted on the vehicle body flap such that the filler neck is pivotable along with the vehicle body flap relative to the container between the first position and the second position and is connected to the opening,
wherein when the vehicle body flap is in the first position, an end portion of the filler neck is partially inserted into an opening portion of the container such that the container is fillable with fluid via the opening and the filler neck; and
a bearing configured to support the opening portion of the container or the end portion of the filler neck in a starting position and allow the opening portion or end portion to move from the starting position to a compensating position within one or more specified degrees of freedom, such that an offset between the opening portion and the end portion when the end portion is inserted into the opening portion is compensated by the movement of the opening portion or end portion into the compensating position.

2. The filling apparatus according to claim 1, wherein the bearing is configured to support the opening portion of the container in a starting position and to allow a movement of the opening portion from the starting position to a compensating position within one or more specified degrees of freedom, such that when the end portion is inserted into the opening portion an offset of the filler neck is compensated by the movement of the opening portion into the compensating position.

3. The filling apparatus according to claim 2, wherein the bearing is configured to compensate for an offset of the filler neck only as far as a maximum compensating position and, when the maximum compensating position is reached, to counteract a further movement of the opening portion or to block the further movement.

4. The filling apparatus according to claim 1, wherein the bearing is a floating bearing.

5. The filling apparatus according to claim 1, wherein the opening portion is configured in a funnel-shaped manner, such that, when the vehicle body flap is pivoted from the second position thereof into the first position thereof, the filler neck is centered by the opening portion, while the bearing compensates for the offset.

6. The filling apparatus according to claim 1, wherein the opening portion is held in the starting position by a restoring force and/or the opening portion is moved back from a compensating position into the starting position by the restoring force of the bearing.

7. The filling apparatus according to claim 1, wherein the filler neck has a sealing ring on the end portion thereof, and
the sealing ring on the outer periphery thereof has a peripheral sealing lip which is in contact with an internal peripheral surface of the opening portion when the vehicle body flap is in the first position.

8. The filling apparatus according to claim 7, wherein the opening portion is partially configured as a folding bellows which, when the vehicle body flap is in the first position, is configured to exert a counter-force as a reaction to a force applied by inserting the end portion of the filler neck into the opening portion, whereby the seal is pushed further into the opening portion.

9. The filling apparatus according to claim 1, further comprising:
a cover element having an emblem arranged on an outer side thereof, the cover element being provided on the opening, and/or
the vehicle body flap is a vehicle body outer part of the vehicle.

10. The filling apparatus according to claim 9, wherein the vehicle body flap is a front flap or an engine hood.

11. A vehicle comprising a filling apparatus according to claim 1.

* * * * *